United States Patent
Havlena et al.

(10) Patent No.: US 11,796,977 B2
(45) Date of Patent: Oct. 24, 2023

(54) PID CONTROLLER AUTOTUNER USING MACHINE LEARNING APPROACHES

(71) Applicant: Honeywell International Inc., Morris Plains, NJ (US)

(72) Inventors: Vladimir Havlena, Prague (CZ); Daniel Pachner, Prague (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 577 days.

(21) Appl. No.: 16/861,863

(22) Filed: Apr. 29, 2020

(65) Prior Publication Data

US 2021/0341895 A1    Nov. 4, 2021

(51) Int. Cl.
*G05B 19/042*    (2006.01)
*G06N 20/00*    (2019.01)
*G05B 13/02*    (2006.01)

(52) U.S. Cl.
CPC ..... *G05B 19/0425* (2013.01); *G05B 13/0265* (2013.01); *G05B 19/0426* (2013.01); *G06N 20/00* (2019.01); *G05B 2219/13095* (2013.01)

(58) Field of Classification Search
CPC ............ G05B 19/0425; G05B 13/0265; G05B 19/0426; G05B 2219/13095; G05B 11/42; G06N 20/00; G06N 3/006; G06N 7/005; G06N 7/01
USPC .................... 700/41 OR, 42 OR, 43; 706/12
See application file for complete search history.

(56) References Cited

U.S. PATENT DOCUMENTS

| 4,903,192 | A | 2/1990 | Saito et al. |
| 5,159,547 | A * | 10/1992 | Chand ............... G05B 13/0275 706/900 |
| 5,406,474 | A | 4/1995 | Hansen |
| 7,496,041 | B2 | 2/2009 | Blevins et al. |
| 9,447,985 | B2 | 9/2016 | Johnson, Jr. |

(Continued)

FOREIGN PATENT DOCUMENTS

| EP | 0481204 A2 | 4/1992 |
| EP | 0481204 A3 | 4/1992 |
| JP | 2019197315 A | 11/2019 |

OTHER PUBLICATIONS

EP Extended Search Report, EP Application No. 21168692.8, dated Sep. 17, 2021 (7 pgs).

(Continued)

*Primary Examiner* — Thomas C Lee
*Assistant Examiner* — Michael Tang
(74) *Attorney, Agent, or Firm* — Seager, Tufte & Wickhem, LLP (57) ABSTRACT

An approach for auto tuning a PID controller that may incorporate determining set-points for controlled variables, obtaining controlled variables from a controlled process module, taking a difference between the set-points and the controlled variable as inputs to a proportional, integral and derivative (PID) controller, calculating a loss or reward from the difference between the controlled variables and the set-points, and achieving set-point tracking. The loss or reward needs to be an increasing or decreasing function of a control error value. Also incorporated may be adding loss or reward components based on controlled variables time difference or control action time difference, which may effect a self-tuned performance of the PID controller.

17 Claims, 8 Drawing Sheets

(56) References Cited

U.S. PATENT DOCUMENTS

| | | | |
|---|---|---|---|
| 9,851,118 | B2 | 12/2017 | Zhao et al. |
| 10,871,756 | B2 | 12/2020 | Johnson, Jr. et al. |
| 10,908,578 | B2 | 2/2021 | Johnson, Jr. et al. |
| 10,921,768 | B2 | 2/2021 | Johnson, Jr. et al. |
| 11,156,978 | B2 | 10/2021 | Johnson, Jr. et al. |
| 2016/0061473 | A1 | 3/2016 | Johnson, Jr. |
| 2017/0261949 | A1* | 9/2017 | Hoffmann .......... G05B 13/0265 |
| 2018/0210406 | A1 | 7/2018 | Shimizu et al. |
| 2019/0094821 | A1 | 3/2019 | Stluka et al. |
| 2019/0187631 | A1* | 6/2019 | Badgwell ................. G06N 3/04 |
| 2020/0256571 | A1 | 8/2020 | Johnson, Jr. et al. |
| 2021/0055712 | A1* | 2/2021 | Yasui ................. G05B 19/4183 |
| 2021/0182385 | A1* | 6/2021 | Roychowdhury ..... G06N 20/00 |
| 2021/0356927 | A1 | 11/2021 | Johnson, Jr. et al. |

OTHER PUBLICATIONS

Building Automation System in Michigan, Johnson Heating and Cooling, L.L.C., www.cooljohnson.com/Building-Automation-Systems-Michigan/Macomb-County-Michigan/Building-Automation-Confidential-Customer.html, 4 pages, Accessed Nov. 21, 2022.

Building Automation System Waterford Michingan 48328 JLA, Johnson Heating and Cooling L.L.C., www.cooljohnson.com/Building-Automation-Systems-Michigan/Waterford-Michigan/Building-Automation-System-JLA.html, 3 pages, Accessed Nov. 21, 2022.

Building Automation Systems Waterford Michigan 48330 SJMO, Johnson Heating and Cooling, L.L.C., www.cooljohnson.com/Building-Automation-Systems-Michigan/Waterford-Michigan/Building-Automation-Systems-SJMO.html, 2 pages, Accessed Nov. 21, 2022.

Building Automation Systems Waterford Michigan 48329 WIM, Johnson Heating and Cooling L.L.C., www.cooljohnson.com/Building-Automation-Systems-Michigan/Building-Automation-Systems-WIM.html, 3 pages, accessed Nov. 21, 2022.

Building Automation Clawson Michigan 2.0, Johnson Heating and Cooling L.L.C., www.cooljohnson.com/Building-Automation-Systems-Michigan/Clawson-Michigan/Building-Automation-Clawson-Manor-2.html, 6 pages, Accessed Nov. 21, 2022.

Building Automation in Detroit—Mosaic Christian, Johnson Heating and Cooling L.L.C., www.cooljohnson.com/Building-Automation-Systems-Michigan/Detroit/Mosaic-Christian.html, 5 pages, Accessed Nov. 21, 2022.

Building Automation in Michigan—Divine Grace, Johnson Heating and Cooling L.L.C., www.cooljohnson.com/Building-Automation-Systems-Michigan/Oakland-County-Michigan/Building-Automation-Divine-Grace.html, 3 pages, Accessed Nov. 21, 2022.

Building Automation System Plymouth, Michigan, Johnson Heating and Cooling L.L.C., www.cooljohnson.com/Building-Automation-Systems-Michigan/Plymouth-Michigan/Building-Automation-System-Plymouth-Michigan.html, 8 pages, Accessed Nov. 21, 2022.

Building Automation Systems Shelby Michigan 48316 SG, Johnson Heating and Cooling L.L.C., www.cooljohnson.com/Building-Automation-Systems-Michigan/Shelby-Township-Michigan/Building-Automation-Systems-SG.html, 3 pages, Accessed Nov. 21, 2022.

Building Automation System St. Clair County, Michigan, Johnson Heating and Cooling L.L.C., www.cooljohnson.com/Building-Automation-Systems-Michigan/St-Clair-Michigan/Building-Automation-system-St-Clair-Michigan.html, 4 pages, Accessed Nov. 21, 2022.

Building Automation System Troy Michigan Oakland Mall, Johnson Heating and Cooling L.L.C., www.cooljohnson.com/Building-Automation-Systems-Michigan/Troy Michigan/Building-Automation-System-Oakland-Mall.html, 4 pages, Accessed Nov. 21, 2022.

Building Automation System Waterford Michigan 48327 Excel, Johnson Heating and Cooling L.L.C., www.cooljohnson.com/Building-Automation-Systems-Michigan/Waterford-Michigan/Building-Automation-System-excel.html, 2 pages, Accessed Nov. 22, 2022.

Building Automation System Romeo Michigan 48065 RomeoPR, Johnson Heating and Cooling, L.L.C., www.cooljohnson.com/Building-Automation-Systems-Michigan/Romeo-Michigan/Building-Automation-System-RomeoPR.html, 2 pages. Accessed Nov. 21, 2022.

Johnson, Jr., "Cooling Logic™: Changing the Way You Cool," Johnson Solid State, LLC, 12 pages, Nov. 7, 2018.

Building Automation System Clawson Michigan Clawson Manor, Johnson Heating and Cooling L.L.C., www.cooljohnson.com/building-Automation-Systems-michigan/clawson-Michigan/building-Automation-System-Clawson-Manor.html, 3 pages, Accessed Nov. 21, 2022.

Johnson, Jr., "CoolingLogic™ A Method to increase HVAC System Efficiency And Decrease Energy Consumption," A White Paper, Johnson Solid State, L.L.C., 51 pages, Sep. 24, 2016.

Johnson, Jr., "CoolingLogic™: Mosaic Christian Church A Case Study," 140 pages, Feb. 2, 2019.

\* cited by examiner

PID CONTROLLER AUTOTUNER USING MACHINE LEARNING APPROACHES

BACKGROUND

The present disclosure pertains to PID controllers and particularly to their tuning.

SUMMARY

The disclosure reveals an approach for auto tuning a PID controller that may incorporate determining set-points for controlled variables, obtaining controlled variables from a controlled process module, taking a difference between the set-points and the controlled variable as inputs to a proportional, integral and derivative (PID) controller, calculating a loss or reward from the difference between the controlled variables and the set-points, and achieving set-point tracking. The loss or reward needs to be an increasing or decreasing function of a control error value. Also incorporated may be adding loss or reward components based on controlled variables time difference or control action time difference, which may effect a self-tuned performance of the PID controller.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Many technicians who install and commission building products often may have little or no understanding of control. Many installers may finalize commissioning and invoice for final payment as soon as they can. Tuning may not be attempted or may not be possible because of weather conditions at the time of commissioning (examples, the heating system controls cannot be tuned in summer, and cooling system cannot be tuned in winter). It appears very common to keep the default settings of the controllers. The end client may be left with discomfort and the manufacturer's reputation may be compromised.

There should be a reliable auto tuner for use during the building automation and control system commissioning, or if poor control performance is detected. There have been numerous attempts to develop a PID auto tuner based on time at frequency domain models. However, a reliable solution seems to be still missing. One may see here a good approach using historical or real time data and machine learning techniques, particularly reinforcement learning.

Figure 1:
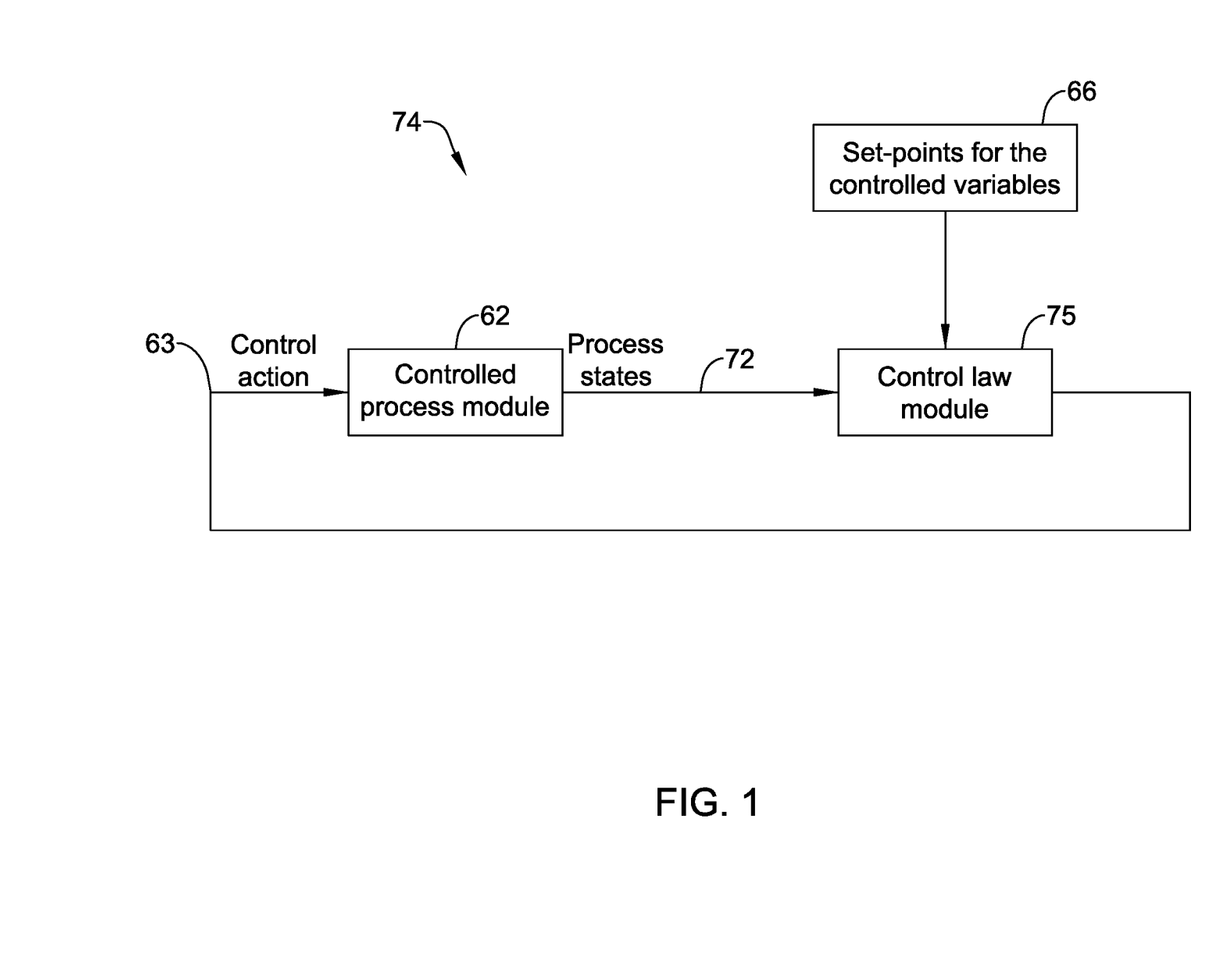
FIG. 1 is a diagram of a controller structure obtained by a usual learning approach.

FIGS. 1-5 illustrate PID auto tuner deployment. FIG. 1 is a diagram of a controller structure 74 obtained by a usual learning approach for comparison with a structure 61 of FIG. 2. A controlled process module 62 may provide a process states output 72 to a control law module 75. Set-points 66 for controlled variables may go to control module 75. Control action from control law module 75 may be an input 63 to controlled process module 62. Control law module 75 or functional block may represent static mappings (i.e., a memory-less system).

Reinforcement learning does not normally produce controllers with integral action. This may be an issue when solving common building control problems where unmeasured disturbance effects are very significant. One may consider a valve controller manipulating the hot/cool water flow through a heat exchanger as such an example. To achieve the same room conditions, a required valve opening may be different based on the number of people occupying the area, number and type of computers running, cloud cover of the sky, wind and sunlight conditions and sun position on the sky (with respect to windows), which depends on the time of the year and time of the day. Not all this information will be available to the control system. In the described situation, the reinforcement learning will be able to discover a control law defining the valve position which is a best guess of the optimal position considering all the information available to the control system, e.g., the current room temperature, time of the day and the outdoor temperature. Thus, such machine learned valve control will not necessarily guarantee offset free tracking of the room temperature set-point when, e.g., the occupancy will differ significantly from the average.

In the above described situation, the common PID controller will integrate the control error moving the valve until the set-point is reached even in the presence of disturbances. It will provide so called steady state offset free tracking. Thanks to this property, it may appear that the PID controllers may still be more appropriate than some modern data scientific approaches like the reinforcement learning.

The present system shows how the reinforcement learning may also produce controllers with integral action like the common PID if the reinforcement learning is slightly reformulated. More accurately, the values used for the standard reinforcement learning algorithm need certain preprocessing steps to produce integral actions. When these steps are applied, the reinforcement learning control law may include the integral action naturally. The number of integrators may be equal to the number of the controlled variables so that all variables can be tracked without steady-state offsets, under normal conditions. Any known or popular reinforcement learning approach may then be used to derive the optimal controller with integral action(s). The same preprocessing applies to both linear and non-linear controllers. The system may thus produce both linear and non-linear PI or PID controllers as special cases. The present approach may apply to multiple input multiple output control loops which cannot necessarily be decomposed due to strong cross interactions between the individual variables.

Figure 2:
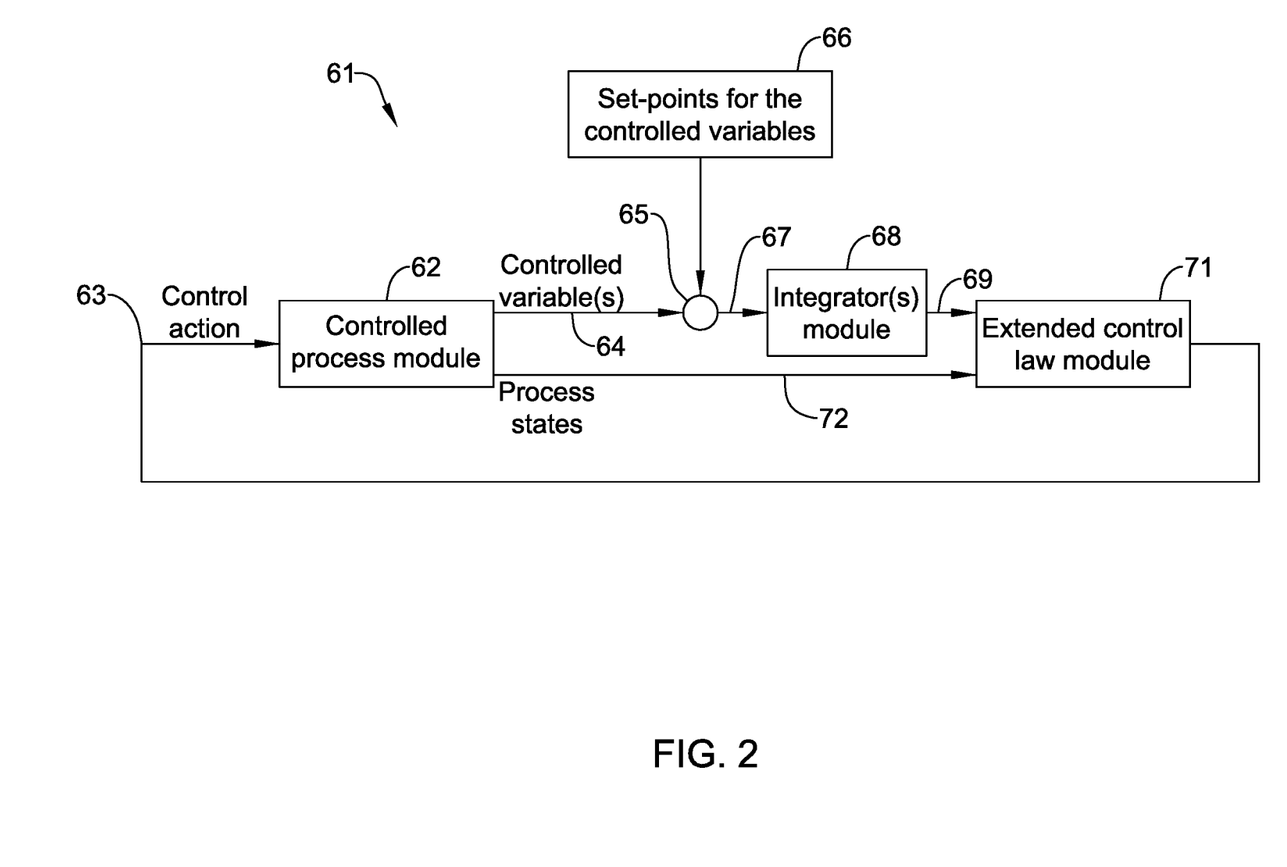
FIG. 2 is a diagram of a controller structure obtained by applying a reinforcement learning approach.

FIG. 2 is a diagram of a controller structure 61 obtained by applying a reinforcement learning approach (with the disclosed modifications). Controlled process module 62 may have a control action input 63. An output 64 of a controlled variable or variables may go to a differentiator 65. Set-points 66 for a controlled variable may go to differentiator 65 calculating their difference. A resulting control error 67 of differentiator 65 may go to an integration module 68. An integrated output may proceed as an input 69 to an extended control law module 71. Process states output 72 may proceed as an input to extended control law module 71. An output of extended control law module 71 may be input 63 of control action to controlled process module 62. The extended control law module 71 or functional block may represent static mappings (i.e., a memory-less system).

Figure 3:
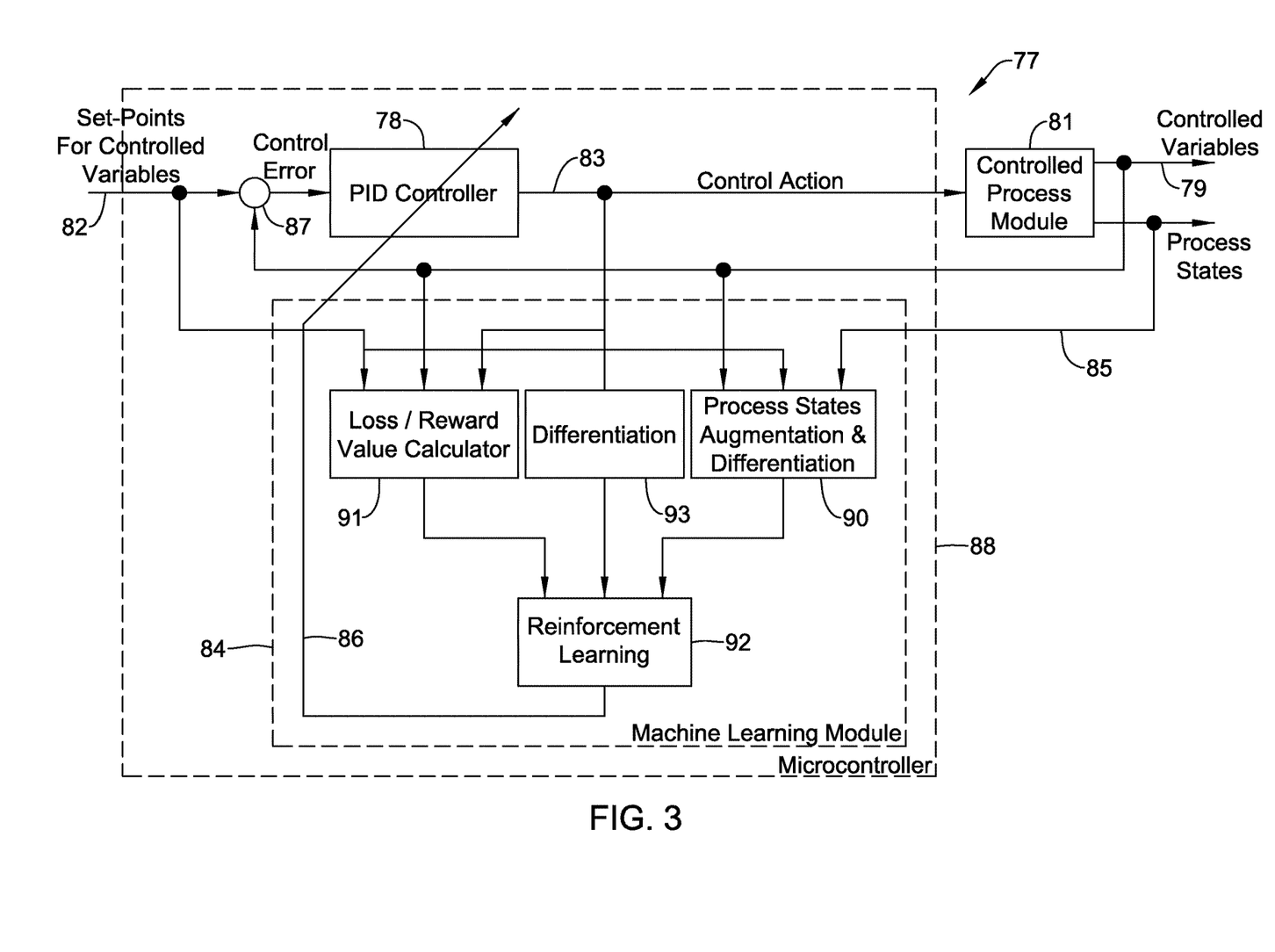
FIG. 3 is a diagram of a variant of an auto tuner PID deployment.
Figure 4:
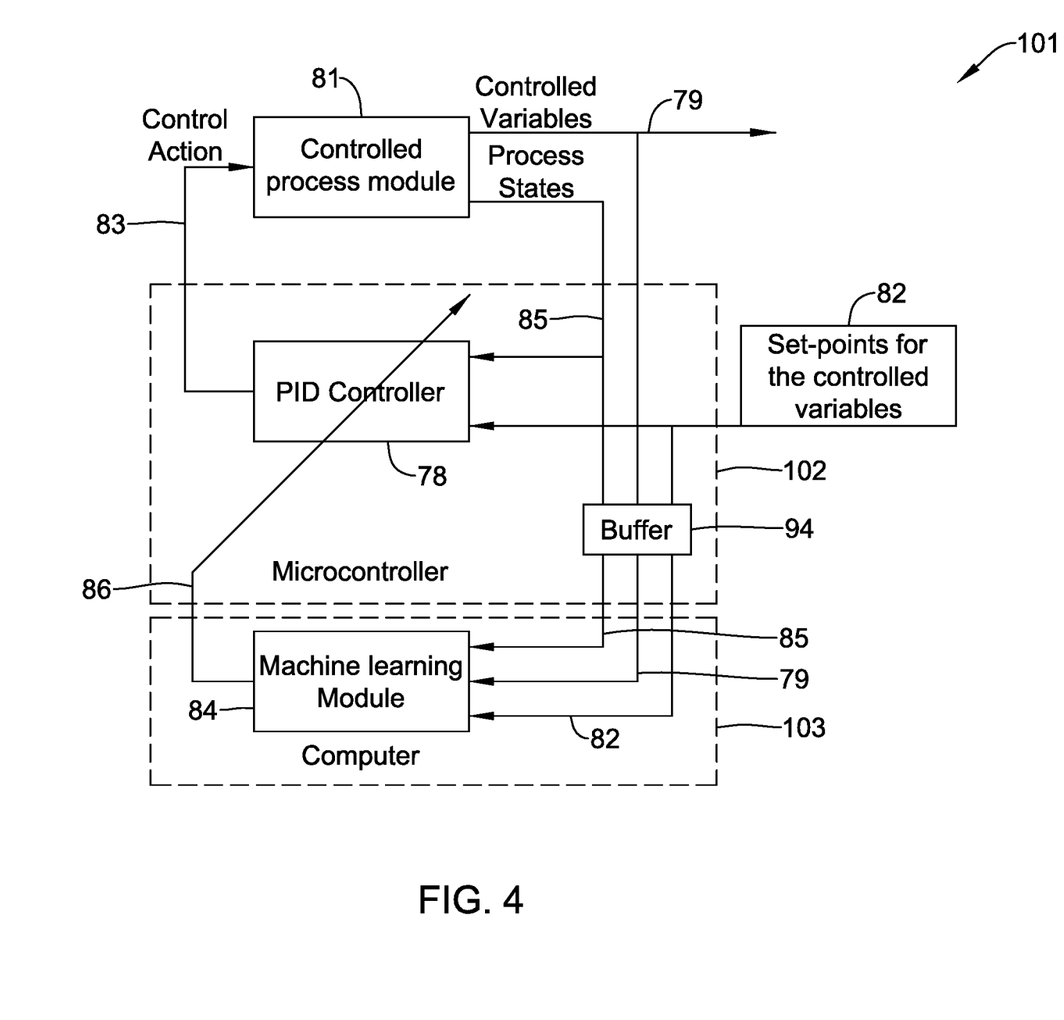
FIG. 4 is a diagram of another variant of an auto tuner PID deployment.
Figure 5:
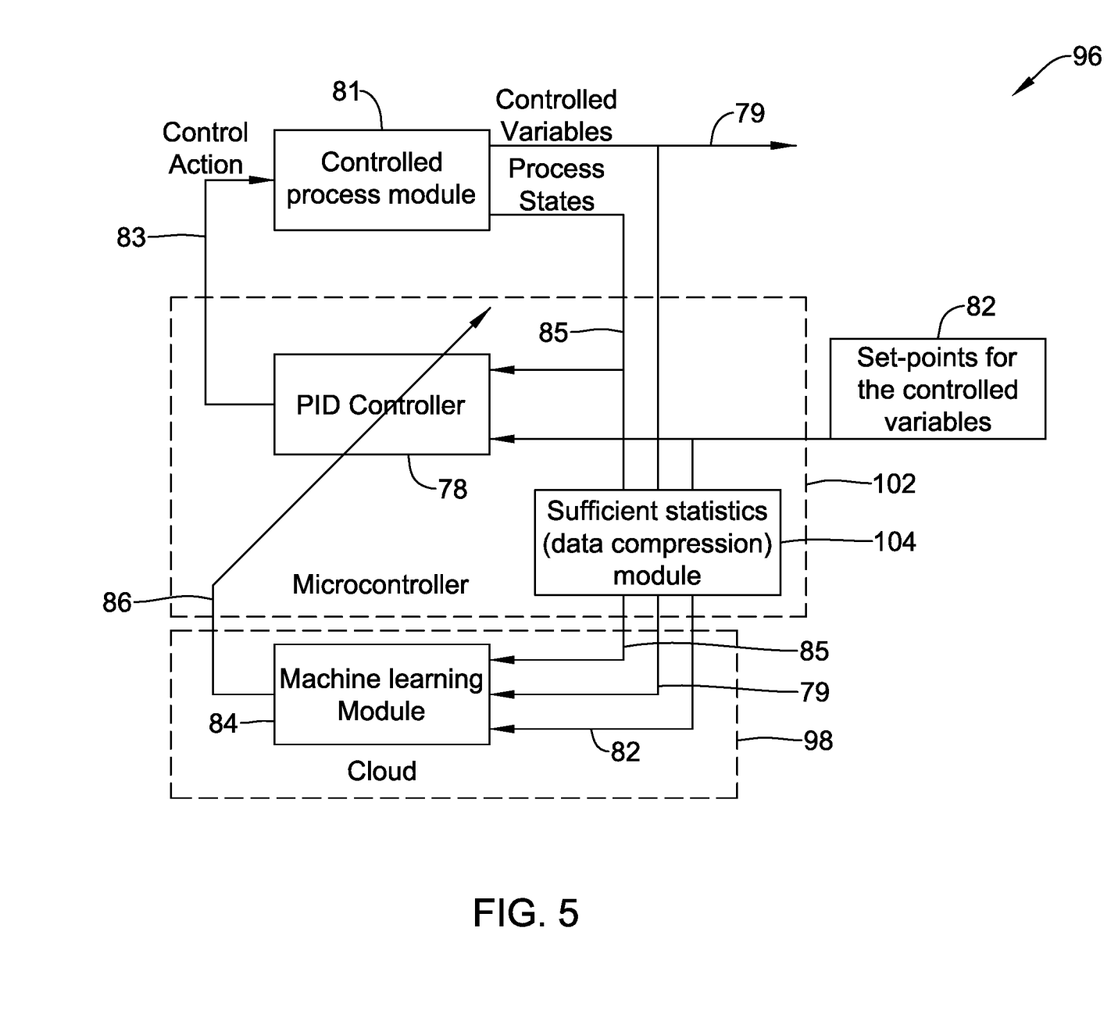
FIG. 5 is a diagram of still another variant of an auto tuned PID controller deployment.

FIGS. 3, 4 and 5 are diagrams of three variants 77, 101 and 96 of PID auto tuner deployment. They may be hardware implemented, respectively, with a microcontroller 88, a microcontroller 102 plus a computer 103, and a microcontroller 102 plus a cloud 98, respectively For variants 101 and 96, the computer may be a standard PC or server. For variant 77, it may be a microcontroller. A possible example of the hardware may be an "i.MX 6" chip, an operating system QNX or Linux, and the structure of the software environment may be noted as below. A PID controller may be running in a so-called DDC engine (direct digital control) and the Q-learning algorithm for controller tuning may be running in an Edge Analytics/ML Engine. A PID controller may provide its input and output data to the auto tuner, and the auto tuner may provide updated values of controller parameters. The communication between the two blocks may be via an internal memory (e.g., a memory mapped file or shared memory).

FIG. 3 is a diagram of variant 77 of an auto tuner PID deployment. A standard PID controller and a reinforcement learning approach may be deployed on the same microcontroller hardware 88. The reinforcement learning approach may be used to optimize controller performance in real time. "PID" here may mean a standard PID controller or a generalized nonlinear control law with integrators integrating the control error.

A PID controller 78 may receive a controlled variable or variables as an input 79 from a controlled process module 81. Set-points 82 for the controlled variables may be input to PID controller 78, which may output a control action as an input 83 to controlled process module 81. In many PID implementations, just the difference between the set-points 82 and the controlled variables 79 are sufficient inputs for the PID. Other PID implementations may require both signals. A machine learning module 84 may receive a controlled variable or variables as an input 79. Set-points 82 for the controlled variable or variables may be input to machine learning module 84. The machine learning module 84 then calculates the instantaneous loss (reward) value by a formula from the absolute differences between the process or controlled variables 79 and the set-points 82. To achieve set-point tracking, the loss (reward) must always be an increasing (decreasing) function of the control error value. Additional instantaneous loss (reward) components may be based on the controlled variables absolute time difference, or the control action absolute time difference, and so on. Such terms allow for additional penalizations of abrupt changes and a calmer control may be achieved. The control system design may add additional functions affecting the loss (reward) value thus affecting the self-tuned controller performance. Such additional reward components may be application dependent. Process states output 85 may proceed as an input to machine learning module 84. The process states 85 may include the available sensor values which comprise the information that the machine learning module may use for the control law optimization. It may also include sensor readings, sensor readings averaged over a past time window, and so on. Data analysis techniques may be used to identify the set of process state related signals and their transforms most relevant for the control optimization. The purpose of these state signals is a good representation of the controlled process current state at current time. The two sets of signals, the process states and the instantaneous loss (reward) values, are the standard inputs to the reinforcement learning algorithm 92 which can derive the optimal control law. The reinforcement learning may then build the action-state value function estimate which describes the expected value of any control action at the current process state. The reinforcement learning algorithm produces control laws gradually converging to the optimal control law, i.e., control actions being optimal at any given state.

To achieve the control law with integral action, the controlled process state differentiation realized in the process augmentation and differentiation module 90 may be the crucial added step. The module may arrange the time differences of the process states into a vector and augmenting it this vector with the control errors thereafter, i.e., controlled variables minus the respective set-points. These time-differentiated and augmented variables are treated as the process state is normally treated by the reinforcement learning algorithms. Then reinforcement learning of module 92 may produce the integral action naturally if it is configured to optimize the controlled process input time difference, not the process input value itself. To this end, the control action supplied to the reinforcement learning module is the time-difference 93 of the control action 83 applied to the controlled process module 81. An output 86 from reinforcement learning module 92 may go to PID controller 78 and optimize performance of PID controller 78. Control action may be an input 83 from PID controller 78 to controlled process module 81 for an optimized control process of module 81. PID controller 78 and machine learning module 84 may be employed on the same hardware of a microcontroller 88.

The difference between the standard reinforcement learning and the proposed modification can be highlighted at this point. With the standard approach, the optimal control action is a function of the current process states and set-points.

With the modified present approach, the optimal control action increment is a function of the process states increments and the current control errors. This change is realized by preprocessing the data for the standard reinforcement learning algorithm.

An issue that the reinforcement learning does not necessarily produce controllers with integral action may be known. Published approaches for applying the reinforcement learning to PID controller auto tuning may therefore consider a fixed controller structure, e.g., PID, and consider the PID parameters as optimized parameters which are subject to a machine learning technique. In this way, the integral action may be enforced by setting the controller structure in advance. It may be recognized that such approach is less general compared to the present approach. The present approach does not need the controller structure to be fully fixed; it can be fully or partly free. The present approach may approximate the control laws by a general continuous function and can produce general non-linear controllers.

FIG. 4 is a diagram of variant 101 of an auto tuner PID deployment. The standard PID controller 78 may be deployed on hardware of a microcontroller 102. Machine learning module 84 may be implemented on a computer 103 having more processing power than microcontroller 102. Both microcontroller 102 and computer 103 may be connected via a LAN. Computer 103 may read process states 85, set-points 82 and controlled variables 79 from a buffer 94, asynchronously. Buffer 94 may update PID parameters using a schedule approach (e.g., periodically, on request, when control performance deteriorates, and so forth).

Controlled variable or variables may be an input 79 to PID controller 78 and to a buffer 94. Set-points 82 for the controlled variables or variables may be input to PID controller 78 and to buffer 94. Process states output 85 from controlled process module 81 may proceed as an input to buffer 94.

Process states 85, controlled variable or variables as input 79 and set-points 82 may come from buffer 94 and go to machine learning module 84. Output 86 from machine learning module 84 may tune PID controller 78 to provide an optimal and updated control action 83 to controlled process module 81 that in turn outputs a controlled variable or variables 79.

FIG. 5 is a diagram of variant 96 of an auto tuned PID controller 78 deployment. The machine learning module 84 may be implemented on a computer of a cloud 98 having more processing power than computer 103 of FIG. 4. Both microcomputer 102 and the computer of cloud 98 are connected via a WAN. The computer of cloud 98 may read sufficient statistics containing process states 85, set-points 82 and controlled variables 79 from a buffer synchronously for machine learning module 84. This may be accomplished with a sufficient statistics (data compression) module 104. Using sufficient statistics, module 104 may minimize the amount of data transferred on the WAN. The cloud 98 computer with machine learning module 84 may update PID controller 78 parameters using a schedule approach (e.g., periodically, on request, when control performance of PID controller 78 deteriorates, and so forth). Process states 85, set-points 82 and controlled variables 79 from sufficient statistics module 104 may incorporate buffer 94 of variant 101 of FIG. 4. In FIG. 5, process states 85, set-points 82 and controlled variables 79 may go from sufficient statistics module 104 to machine learning module 84 at cloud 98. Output 86 from machine learning module 84 may tune PID controller 78 to provide an optimal and updated control action to controlled process module 81, which in turn outputs a controlled variable or variables 79.

The sufficient statistics and data compression may be described as below. The reinforcement learning algorithms like Q-learning solve an estimation problem estimating the action-state value function also denoted as Q-function in the first step. The estimation may be based on the least squares method variant, e.g. the popular Least Squares Temporal Difference Learning (LSTD) method. In the second step, the estimated Q-function is minimized because the optimal control action is known to minimize it. The estimations and minimizations steps may be repeated iteratively gradually converging to the optimal control law in a process known as "policy iteration." One may note that the Q-learning results may be identical if the actual process data would be replaced with a different set of data if the new data will lead to the same Q-function estimate. Using this idea, one may update a minimum equivalent virtual dataset in the edge device sending the same to the cloud instead of the actual data set. In the cloud, where the control law optimization happens, the results will be unaffected. The minimum virtual dataset (sufficient statistics) must produce the exactly same normal equations of the LSTD algorithm. This approach can ensure the data transfer between the edge level controller and the cloud computer is minimized. It may be noted that in many cases, like linear controller structure and quadratic Q-function, the sufficient statistics dimension is fixed, i.e., the amount of data transferred to the cloud does not necessarily depend on the amount of data processed. It may also be noted that the sufficient statistics may be related to the triangular form of the normal equations relevant for the LSTD problem. The cloud computer may then be able to perform all the optimization without any loss of information, i.e. to find the optimal policy exactly as from all the process data. It may be noted that this data transfer minimization may make the machine learning based controller optimization more practical for many applications for two reasons. First, the edge devices may be incapable of performing the demanding numerical optimizations. Second, the cloud computer may have access to many edge devices and the "transfer learning" may be used. In such approach, the new devices appearing in the network learn later faster taking the advantage of using the knowledge already accumulated by other edge devices which may have started the learning earlier. The transfer learning must consider that only edge devices which solve similar control problems can share the knowledge.

The PID solution may be further illustrated in the following. The solution may reside in edge devices and provide satisfactory or near optimal performance after a one or two day operation. The solution may eliminate customer discomfort and energy waste. The solution may also reduce installation and commissioning cost, and be autonomous, involving significantly limited maintenance effort and cost. An advantage is that the proposed PID-like control strategy may be extended to multivariable cases and feedforward action.

The present approach may be based on an optimal control theory, known as dynamic programming that operates on a system state. In artificial intelligence, a similar approach may be used for machine learning. It is called Q-learning and the main contribution over dynamic programming may be an opportunity to evaluate the optimal value function using any real-time data from the controlled process, being a so called off-policy learning.

The core idea of the present disclosure is to time-differentiate and augment the "state" of the controlled process by the tracking error (a difference between the reference value and process output). At the same time, the optimized control action must be the time increment of the current action, not the value itself. Then the optimal control strategy based on this approximate state representation may result in feedback gains that are equivalent to (multivariable) PID controller gains and therefore can be used for PID controller auto tuning.

The controller may also incorporate other measured variables, for example, a preview of the next reference value and a set of measurable disturbances. Then the control may be equivalent to a PID with feedforward from measurable disturbances and some predictive functionality. Unlike the "brute force" applications of machine learning techniques in control, that may require millions of data samples and long learning periods (weeks or months), the Q-learning method of the proposed auto tuner may be modified by incorporation of control-relevant prior information, that can guarantee faster convergence (about one to two days) and acceptable control performance during the learning phase, so that the algorithm can be running on real-time process data.

Typical applications may include single input single output (SISO) zone temperature controllers or many input many output (MIMO) fan-coil unit controllers.

The present disclosure followed the go-no-go review of a C machine learning project, looking for a practical application of a generic learning algorithm. In general, there may be a software component. A stack level may incorporate gateway/control of local control, management, administration, operations and data consolidation applications; or a translation layer between local environment and cloud enabling their communication. Software type may be embedded-software may run in a device/unit (e.g., firmware).

It appears that more than ninety percent of real-world control issues may be solved by simple PID controllers. A PID controller may typically solve one of the following or both items. There may be a constant reference tracking issue. A process variable $y_t$ should track a desired reference value $r_t$. For example, a thermostat may track a desired room temperature set by the user. There may be a constant disturbance rejection issue. A process variable $y_t$ is disturbed by an external (usually but not necessarily unknown) disturbance $d_t$, which the controller should counteract. For example, a thermostat should counteract the effects of ambient temperature or insolation changes on the room temperature. Here, the word "constant" may be misleading. It may mean that the signal usually maintains the same value for a sufficient time. Signal changes are not necessarily zero or small but the large changes should be reasonably rare.

A PID controller appears to be a very common controller in industrial applications. There may be a common analog formulation of the controller as follows.

$$u_t = K_P y_t + K_i \int_0^t (y_\tau - r_\tau) d\tau + K_d \frac{dy_t}{dt}$$

Also, there may be a digital form with a one step delay. Variants may exist.

$$u_t = K_P y_{t-1} + K_i \sum_{\tau=0}^{t-1} (y_\tau - r_\tau) + K_d(y_{t-1} - y_{t-2})$$

The terms may include $y_t$ as a process variable, $r_t$ as a reference value (a desired value for $y_t$), $u_t$ as a control action (a controller output), and $K_p$, $K_i$, $K_d$ as proportional, integral, and derivative gains, respectively. These may be represented by the P, I and D in a PID's name.

An offset-free tracking and disturbance rejection may be noted. Important metrics of nearly any controller may include speed of response, control activity, steady state accuracy, and disturbance rejection.

PID controllers may use derivative action to increase a speed of response, use integral action to achieve zero steady-state error (i.e., track a constant reference) and use integral action to reject constant disturbances (acting on either input $d_u$, or process $d_p$, or output $d_y$).

Figure 6:
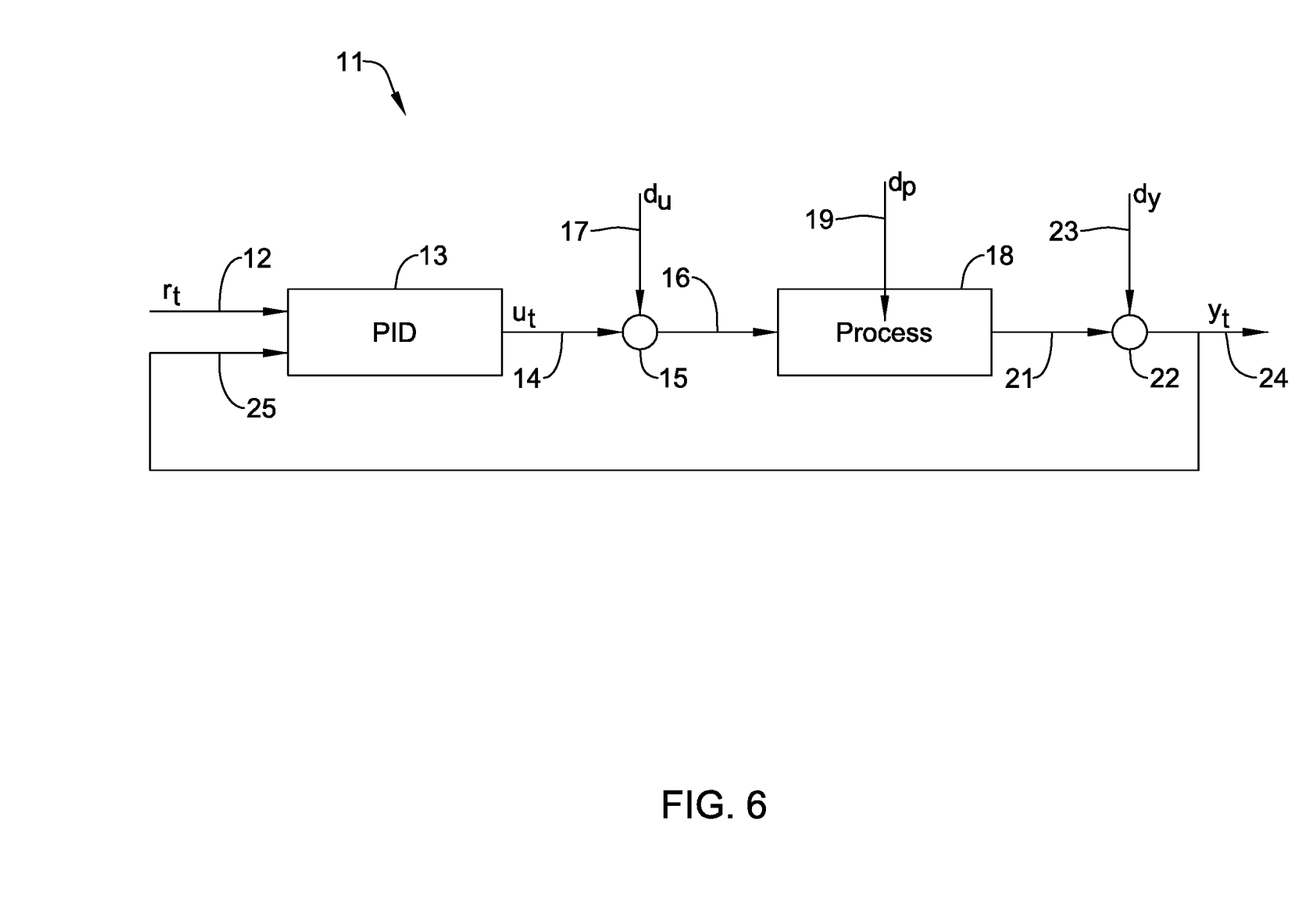
FIG. 6 is a diagram of an illustrative controller arrangement.

FIG. 6 is a diagram of an illustrative controller arrangement 11. A reference value $r_t$ may be an input 12 to a PID module 13, which may have an output 14 of a control action $u_t$ that goes to an input 16 of a process module 18 after it receives an input disturbance $d_u$ as an input 17 as represented by a summing junction 15. A process disturbance $d_p$ may go to an input 19 of process module 18. An output 21 may have an output disturbance $d_y$ added to as an input 23 to a summing junction 22 with an output 24 of a process variable $y_t$. Output 24 may be fed back as an input 25 of PID module 13.

PID tracking and disturbance rejection may be noted. Two important metrics may be usually solved by an integral action. The metrics may be accurate constant reference tracking and constant disturbance rejection. The PID gained favor and still may maintain its popularity mainly because it is usually good with the above-noted two metrics. It may be the "I" which may ensure it. The "P" and "D" may then improve the speed of response.

There may be other reasons for PID popularity. The PID may have just three parameters which are a sufficiently low number allowing tuning by just trial and error or some more formal but simple PID calibration methods. Such calibration methods may be usually much quicker compared to a mathematical derivation of the optimal control law which may require special skills and a mathematical model of the process in the first place.

The PID may be essentially a model-free approach. Many real-word PID's may be tuned without an accurate process model which saves enormous amounts of engineering time. Not all control problems may be solved by a PID; however, such problems are relatively rare in industrial control applications.

Machine learning appears to be a relatively new area of applied mathematics and computer science gaining popularity. Using machine learning methods, computers may solve very complicated problems which could not be solved without human intervention or otherwise could not be solved at all. Machine learning may save large amounts of engineering time.

Here, one may show how to solve a PID tuning problem with a special machine learning method called Q-learning. It may be essentially a formalized "trial-and-error" method. The Q-learning may try what the PID could do and, based on an observed outcome, it can improve the $K_p$, $K_i$, $K_d$ values.

The Q-learning may be a formal and optimal trial-and-error approach. No process model is necessarily needed. Q-learning may replace a control engineer who might be tuning a PID. As to a definition of Q-Learning, it may be a machine learning algorithm for solving a Markov decision problem. An agent may get the process state $x_t$ known. The agent may chooses an action $u_t$ which affects probability of the next process state $x_{t+1}$ (which is partly random). The agent may pay the loss $l(u_t, x_t)$ for choosing the action at the state. (One may note that a part of the literature uses the reward $r(u_t, x_t)$ which is paid to the agent.) An optimal agent's policy $\pi^*$ may minimize an expected sum of discounted ($\gamma<1$ is discounting rate) future l's (expected losses).

$$L^\pi(x_t) = \sum_{\tau=0}^{\infty} \gamma^\tau E\{l(u_{t+\tau}, x_{t+\tau}) | x_t\}, u_{t+\tau} = \pi(x_{t+\tau})$$

$$L^*(x_t) \le L^\pi(x_t)$$

Figure 7:
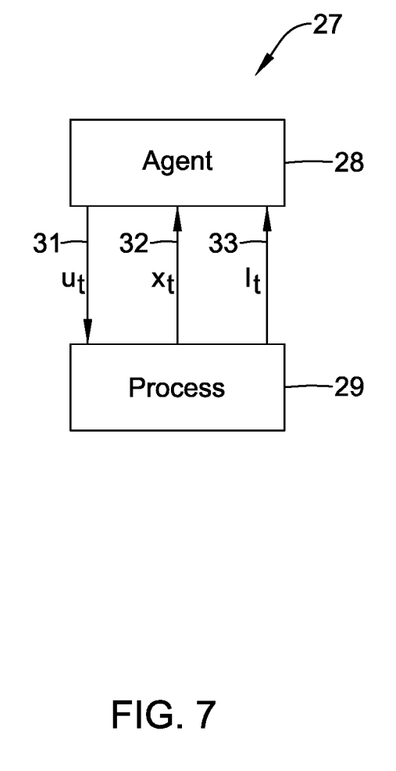
FIG. 7 is a diagram of an arrangement of an agent and a process module.

FIG. 7 is a diagram of an arrangement 27 of an agent 28 and a process module 29. Agent 28 may provide an output 31 of a control action $u_t$ to a process module 29. A process state $x_t$ may be an output 32 from process module 29 to agent 28. A loss $l_t$ may be an input 33 to agent 28, or $l_t$ may be regarded as a payout by agent 28.

It may be noted that the loss function value can often be decomposed into several additive components, each component related to an objective. The individual objectives are often contradictory. In a typical building control system, the system designer may choose a non-negative weighting factors $w_j$ for each component, e.g., comfort level, energy efficiency, valve movement frequency related to component lifetime. It is reasonable that a perfect set-point tracking is partly given up in favor of efficiency and component life. It may be noted that the described approach may understand such weighting factors as parameters which may be changed in the real time. Changes of the objectives weighting do not necessarily disturb the machine learning process itself.

The Markov decision process is interesting because the agent does not necessarily only minimize the instantaneous loss, it needs to take all the future losses into account. It should consider the future effects of the current action. The agent needs to have some ability of planning. The planning is ensured by summing future losses.

One may note Q-Learning versus a PID. Q-learning may find the optimal agent's policy that minimizes the expected sum of discounted future l's (expected losses). The PID problem may be obviously formulated as a Markov decision process. The process is not necessarily model based, it is observation based. However, a naïve application of the Q-learning may lead to the following affine control law (compare with PID).

$$u_t = k + K_x x_t + K_u u_{t-1} + K_r r_t$$

Here, $x_t$ may be the plant state. So there may be no integral action in such a Machine learning based controller. Therefore, it does not necessarily track a constant reference accurately when the process behavior slightly changes (e.g., aging, production dispersion, different parameters site to site). It does not necessarily reject unknown constant disturbances. It may require all state variables to be measured.

Q-learning versus PID may be noted. A naive Q-learning based controller may lack the properties of the PID because it has no integral action. Integral action cannot necessarily be added by adding a disturbance observer, which is the standard control theoretic approach, because one seeks a model-free approach. A solution may be that one has found that the integral action can be reestablished when:

1. The Q-learning may use a transformed or augmented state vector $x_t^a$ instead of the process state vector $x_t^P$.

This new $x_t^a$ may be defined as $$x_t^a = \begin{bmatrix} x_t^P - x_{t-1}^P \\ y_{t-1} - r_{t-1} \end{bmatrix}$$

2. The Q-learning may optimize the control action increments $u_t - u_{t-1}$, not necessarily the absolute values $u_t$.

This approach 1+2 may result in the following controller, $$u_t = K_x x_t^P + K_e \sum_{\tau=0}^{t-1} (y_\tau - r_\tau)$$

The Q-based PID structure may be noted. Thus, one may have found how to use Q-learning to get this controller structure (the gains $K_x$ and $K_e$), $$u_t = K_x x_t^P + K_e \sum_{\tau=0}^{t-1} (y_\tau - r_\tau)$$

which may have an integral action so it can share the good tracking and disturbance rejection properties with the PID. It is actually a superset of PID. The classical PID may be obtained when the process state is approximated as $$x_t^P \approx \begin{bmatrix} y_{t-1} \\ y_{t-1} - y_{t-2} \end{bmatrix}.$$

In this case, the augmented $x_t^a$ may contain $y_t$ first and second time differences. It may allow further generalizations, for example:

$$x_t^P \approx \begin{bmatrix} y_{t-1} \\ y_{t-1} - y_{t-2} \\ d_{t-1} \end{bmatrix}$$

may naturally produce a PID with feedforward from a measured disturbance $d_{t-1}$.

Generalized PID structures may be noted. Using the found Q-learning approach, the following PID controllers can be optimized (i.e., machine learned).

Figure 8:
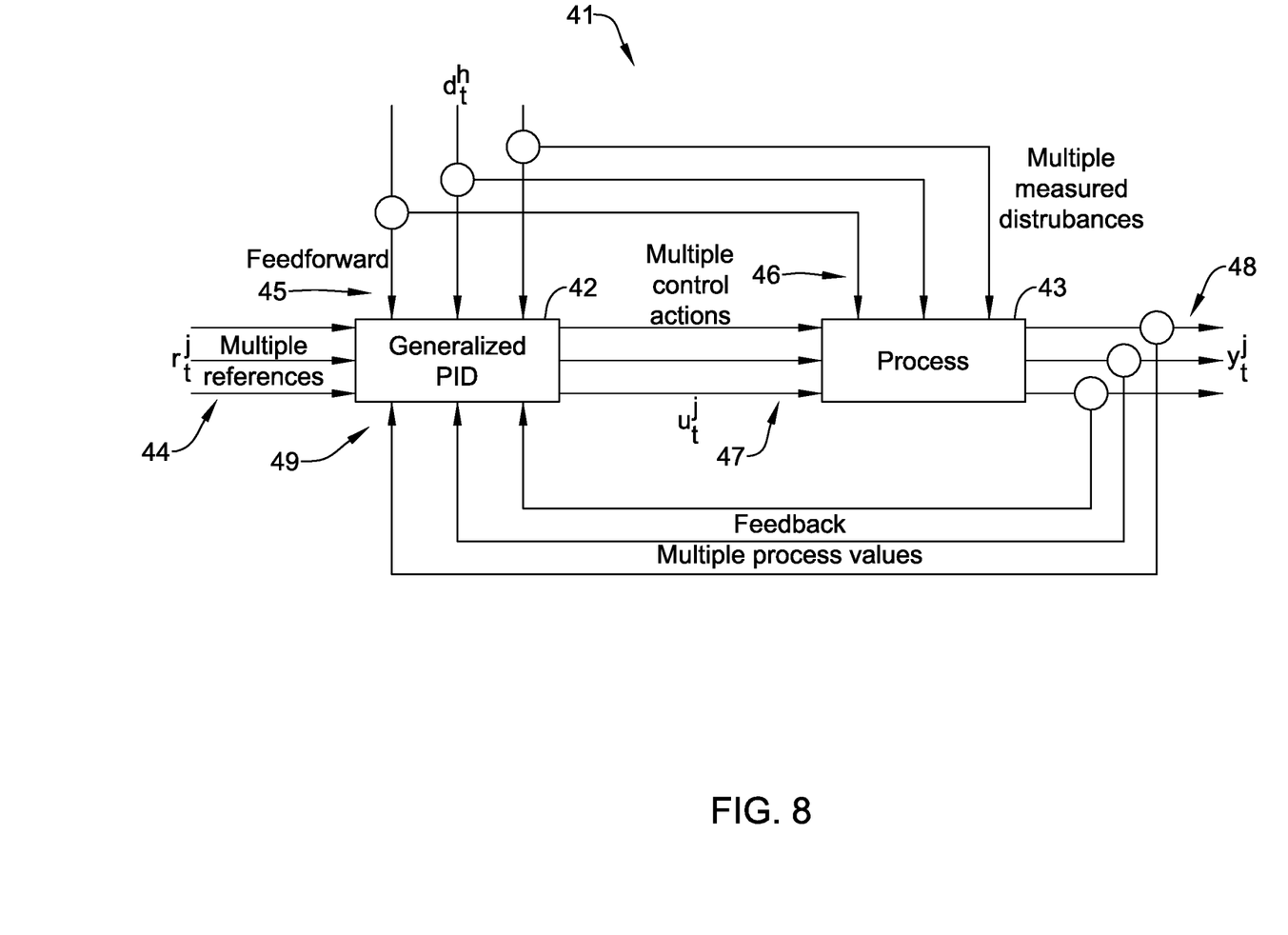
FIG. 8 is a diagram of an arrangement of generalized PID structures.

FIG. 8 is a diagram of an arrangement 41 of generalized PID structures. Multiple references $r_t^j$ may be entered via inputs 44 to a generalized PID 42. Multiple measured disturbances $d_t^h$ may be feedforward as inputs 45 to generalized PID 42 and as inputs 46 to a process module 43. Multiple control actions $u_t^j$ may be output by generalized PID 42 to inputs 47 of process module 43. Outputs 48 of process module 43 may provide multiple process values $y_t^j$ that may be feedback to inputs 49 of generalized PID 42. The multiple process values $y_t^j$ may be considered as the output from arrangement 41.

$$u_t^i = K_p^{i,j} y_{t-1}^j + K_p^{i,j}(y_{t-1}^j - y_{t-2}^j) + K_e^{i,j} \sum_{\tau=0}^{t-1}(y_\tau^j - r_\tau^j) + K_{FF}^{i,h} d_{t-1}^j$$

Here, i and j may be indices of a multiple control action and process variables 1 . . . n. And h may be an index of optional external measured disturbance.

Generalized structures with multiple references may be noted. A generalized PID structure may be obtained by stacking all process variables and all reference values 1 . . . n into a single augmented state vector for the Q-learning as follows:

$$x_t^a = \begin{bmatrix} y_{t-1}^1 - y_{t-2}^1 \\ y_{t-1}^1 - 2y_{t-2}^1 + y_{t-3}^1 \\ y_{t-1}^1 - r_{t-1}^1 \\ \vdots \\ y_{t-1}^n - y_{t-2}^n \\ y_{t-1}^n - 2y_{t-2}^n + y_{t-3}^n \\ y_{t-1}^n - r_{t-1}^n \end{bmatrix}$$

with adding time increments of, e.g., measured disturbances and lagged control actions optionally. Such approach may add the optional feedforward actions. One may note that this generalization may be actually very straightforward, unlike the standard PID calibration methods which do not necessarily allow for multiple references.

Gain scheduling may be noted. The PID may be further generalized if the Q-function used in Q-learning is parameterized with any external parameter α. Such approach may result in the PID-like controller, $$u_t = K_x(\alpha)x_t^p + K_e(\alpha)\sum_{\tau=0}^{t-1}(y_\tau - r_\tau)$$

This approach may be known as gain scheduling. The PID parameters are parameterized by α. In practice, they are usually obtained by tuning the same PID for several different values of α and then either switching or interpolating $K_p(\alpha)$, $K_i(\alpha)$, $K_d(\alpha)$ based on α. Here, α may be any external parameter which is not necessarily immediately affected by the control actions but which changes the process behavior. α is, e.g., ambient temperature or some process operating point characteristics. Q-learning may produce gain scheduled PID very naturally just analyzing the process data.

Conclusion and highlights may be noted. The found approach may apply Q-learning theory as indicated here.

1. To get control laws with integral actions, thus having the PID ability to reject disturbances and track constant references robustly.

2. The found controller may be a superset (generalization) of a PID. It may very naturally generalize to:
  a. Multiple Input Multiple Output PID
  b. PID with feedforward from external disturbances
  c. PID with gains scheduled by a number of external parameters
  d. PID with control error and control error derivative noise attenuating filters. The filters may be tuned by the Q-learning directly (a method not necessarily covered by this disclosure).

The key idea of the found method is that Q-learning may:
  1. Optimize the control increments, not controls directly.
  2. Use a specific augmented state which contains control errors and processes state time differences. The process state may be an approximation based on actual measured signals (e.g., process variable and its time difference).

To recap, a PID controller system may incorporate a proportional, integral and derivative (PID) controller, a machine learning module having an output connection to the PID controller, and a controlled process module that provides controlled variables to the PID controller via a differentiator that also takes in set-points for the controlled variables and the differentiator outputs a control error to the PID controller, where the control error is a difference between the set-points and the controlled variables. The controlled variables and set-points for the controlled variables may be input to the machine learning module. The machine learning module may calculate an instantaneous loss or reward which is an increasing or decreasing, respectively, function of the control error.

Additional loss or reward components may be based on a controlled variables absolute time difference or control action absolute time difference.

The machine learning module may incorporate a reinforcement learning module that provides the output from the machine learning module to the PID controller, a loss or reward calculator having inputs of controlled variables, set-points for controlled variables, and control action, and having an output to the reinforcement learning module, a differentiator having an input of a control action from the PID controller and having an output to the reinforcement learning module, and a process states augmentation and differentiation module having inputs of process states, controlled variables, and set-points for controlled variables, and having an output to the reinforcement learning module.

An output of the reinforcement learning module may provide auto tuning for the PID controller that includes integral action that ensures a steady state offset free tracking of set-points by relevant process variables.

Using process state and control time difference and augmenting differentiated states with control errors before use as data for the reinforcement learning module, may be effected.

A process state may be defined as controlled process variables values and time differences thus producing a standard PID linear controller having proportional, integral and derivative actions for each process variable including optimized loop interactions.

The auto tuning mechanism may have a multi-objective loss function consisting of multiple losses with a pre-specified non-negative weighting factor where a Q-function has weighting factors as parameters and produces an optimal control law for any values of the weighting factors at any time without a restart of an auto tuner needed.

Sufficient statistics relevant for an action state value function estimation being collected in an edge controller and transferring the statistics along to a cloud computer that provides reinforcement learning may result in sending an updated control law back to the edge controller.

An approach for auto-tuning a PID controller may incorporate determining set-points for controlled variables, obtaining controlled variables from a controlled process module, taking a difference between the set-points and the controlled variable as inputs to a proportional, integral and derivative (PID) controller, calculating a loss or reward from the difference between the controlled variables and the set-points, and achieving set-point tracking, wherein the loss or reward needs to be an increasing or decreasing function of a control error value.

The approach may further incorporate adding loss or reward components based on a controlled variables time difference or control action time difference.

The adding the loss or reward components may effect a self-tuned performance of the PID controller.

The approach may further incorporate passing an output of a control action to a controlled process module, and having an output of process states from the controlled process module proceed as an input to a machine learning module. The process states may contain information that the machine learning module uses to develop with a reinforcement learning algorithm to produce control laws that converge to an optimal control law that is sent to the PID controller to optimize performance of the PID controller.

Reinforcement learning may produce integral action when it is configured to optimize a controlled process input time difference. Control action supplied to reinforced learning may be a time difference of the control action applied to the controlled process module.

An auto tuner system may incorporate a machine learning module, a proportional, integral and derivative (PID) controller having an input connected to the machine learning module, a controlled process module having an input connected to the PID controller, and a differentiator having an input connected to the controlled process module and an output connected to the PID controller.

The machine learning module may incorporate a loss or reward value calculator having an input of set-points for controlled variables, a second input of controlled variables from the controlled process module, a third input of a control action from the PID controller, and an output to a reinforcement learning submodule.

The machine learning module may further incorporate a process states augmentation and differentiation submodule having a first input of controlled variables from the controlled process module, a second input of set-points for the controlled variables, a third input of process states from the controlled process module, and an output to the reinforcement learning module.

The machine learning module may further incorporate a differentiation submodule having an input of control action from the PID controller and an output to the reinforcement learning module.

The input of the differentiator may receive control variables from the controlled process module, a second input of the differentiator may receive set-points for the controlled variables, and an output may provide a control error to the PID controller.

The control error may be integrated at the PID controller.

The PID controller and the machine learning module may be deployed on the same microcontroller hardware.

Any publication or patent document noted herein may hereby be incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A proportional, integral, and derivative (PID) controller system comprising:
PID controller configured to output a control action to a controlled process module, the control action is based on an output provided to the PID controller and is configured to affect a value of one or more controlled variables;
a machine learning module implemented by one or more processors having a reinforcement module that provides the output to the PID controller via an output connection to the PID controller; and
a controlled process module configured to receive, as an input, the control action outputted from the PID controller, the controlled process module provides values of controlled variables to the PID controller via a differentiator that also takes in set-points for the controlled variables and the differentiator outputs a control error to the PID controller, wherein the control error is a difference between the set-points and the values of the controlled variables; and wherein:
the values of controlled variables and set-points for the controlled variables are input to the machine learning module; and
the machine learning module calculates the instantaneous loss or reward which is an increasing or decreasing, respectively, function of the control error;
the machine learning module determines the time-differentiated and augmented variable process states based on process states outputted from the controlled process module, the set-points for the controlled variables, and the values of the controlled variables;
the reinforcement module is configured to receive the instantaneous loss or reward, the time differences of control actions, and the time-differentiated and augmented variable process states and determine the output provided to the PID controllers based on the instantaneous loss or reward, the time differences of control actions, and the time-differentiated and augmented variable process states.

2. The system of claim 1, wherein additional instantaneous loss or reward components are based on a controlled variables absolute time difference or a control action absolute time difference.

3. The system of claim 1, wherein the machine learning module comprises:
a loss or reward calculator having inputs of controlled variables, set-points for controlled variables, and control actions, and having an output to the reinforcement learning module;
a control action time differencing differentiator having an input of the control action from the PID controller and having an output of the time differences of control actions to the reinforcement learning module; and
a process states augmentation and differentiation module having inputs of the process states, the values of the controlled variables, and the set-points for controlled variables, and the outputting time-differentiated and augmented variable process states to the reinforcement learning module.

4. The system of claim 3, wherein an output of the reinforcement learning module provides auto tuning for the PID controller that includes integral action that ensures a steady state offset free tracking of set-points by relevant process variables.

5. The system of claim 4, wherein the auto tuning mechanism has a multi-objective loss function consisting of multiple losses with a pre-specified non-negative weighting factor where a Q-function has weighting factors as parameters and produces an optimal control law for any values of the weighting factors at any time without a restart of an auto tuner needed.

6. The system of claim 5, wherein sufficient statistics relevant for an action state value function estimation being collected in an edge controller and transferring the statistics along to a cloud computer that provides reinforcement learning results in sending an updated control law back to the edge controller.

7. A method for auto tuning a proportional, integral, and derivative (PID) controller comprising:
determining set-points for controlled variables;
obtaining controlled variables from a controlled process module;
taking a difference between the set-points and the controlled variable as inputs to the PID controller, the differences between the set-points and the controlled values are controlled error values;

calculating a loss or reward from the difference between the controlled variables and the set-points;

achieving set-point tracking, wherein the loss or reward is an increasing or decreasing function of the control error value;

determining control action time differences;

providing an output to the PID controller, wherein the output is based on the control action time differences, the time-differentiated and augmented variable process states, and the loss or reward calculated; and passing an output of a control action to the controlled process module from the PID controller, wherein the control action is based on the output provided to the PID and is configured to affect a value of one or more of the controlled variables.

8. The method of claim 7, further comprising adding loss or reward components based on a controlled variables time difference or the control action time difference.

9. The method of claim 8, wherein the adding the loss or reward components effect a self-tuned performance of the PID controller.

10. The method of claim 9, further comprising:

having an output of process states from the controlled process module proceed as an input to a machine learning module implemented by one or more processors; and wherein process states contain information that the machine learning module uses to develop with a reinforcement learning algorithm to produce the output provided to the PID controller, the output provided to the PID controller includes control laws that converge to an optimal control law to optimize performance of the PID controller.

11. The method of claim 10, wherein:

reinforcement learning produces integral action when it is configured to optimize the controlled action time difference; and the control action supplied to reinforced learning is a time difference of the control actions applied to the controlled process module.

12. An auto tuner system comprising:

a machine learning module implemented by one or more processors;

a proportional, integral and derivative (PID) controller having an input connected to the machine learning module and configured to determine a control action based on an output received from the machine learning module, the control action is configured to affect a value of one or more controlled variables;

a controlled process module having an input connected to the PID controller and configured to receive the control action determined; and a differentiator implemented by one or more processors having an input connected to the controlled process module and an output connected to the PID controller; and wherein the machine learning module comprises:

a process states augmentation and differentiation submodule having a first input of values of controlled variables from the controlled process module, a second input of set-points for the controlled variables, and a third input of process states from the controlled process module, and an output to a reinforcement learning submodule of time-differentiated and augmented variable process states determined based on the first input, the second input, and the third input; and the reinforcement learning submodule providing the output to the PID controller, the reinforcement learning submodule determines the output to the PID controller based on a calculated loss or reward, control action time differences, and the time-differentiated and augmented variable process states determined.

13. The system of claim 12, wherein the machine learning module comprises a loss or reward value calculator having an input of set-points for controlled variables, a second input of controlled variables from the controlled process module, a third input of a control action from the PID controller, and an output to the reinforcement learning submodule.

14. The system of claim 12, wherein the machine learning module further comprises a differentiation submodule having an input of control action from the PID controller and an output of the control action time differences to the reinforcement learning module.

15. The system of claim 12, wherein the input of the differentiator receives control variables from the controlled process module, a second input of the differentiator receives set-points for the controlled variables, and an output provides a control error to the PID controller.

16. The system of claim 15, wherein the control error is integrated at the PID controller.

17. The system of claim 12, wherein the PID controller and the machine learning module are deployed on the same microcontroller hardware.

* * * * *